July 7, 1970     R. MOHR     3,519,141

PAPER CUTTING MACHINES

Filed May 6, 1968

INVENTOR:
RUDOLF MOHR

By Glassock, Downing & Seebold

Attorneys.

United States Patent Office 3,519,141
Patented July 7, 1970

3,519,141
PAPER CUTTING MACHINES
Rudolf Mohr, Hattershemerstrasse,
Hofheim, Taunus, Germany
Filed May 6, 1968, Ser. No. 726,944
Claims priority, application Germany, May 6, 1967,
1,536,466
Int. Cl. B23q 5/22
U.S. Cl. 214—1.6                    4 Claims

ABSTRACT OF THE DISCLOSURE

A paper stack cutting machine stack guide rake having adjustable rake teeth for obtaining accurate alignment and abutment of the stack against the rake during cutting.

BACKGROUND OF THE INVENTION

The invention relates to a guide rake for a paper-cutting machine.

In a paper-cutting machine, a paper stack to be cut is moved by means of a feed gauge along a cutting table towards a cutting knife or knives. In order that the individual cuts remain parallel along the sheets of the stack, it is necessary that the rear face of the stack accurately abuts against the rake of the feed gauge across the width of the stack.

During printing, however, the sheets may distort so that their rear edges are not even and acquire convexities with the consequence that the material to be cut no longer lies fast against the gauge over its whole width and can tilt about these convexities on the rake face.

In order to prevent tilting, an improvement was made in that, between the rake and the rear surface of the stack, so-called guide blocks were fitted to compensate for convexities and retain the stack in accurate alignment during the feed movement.

The application of these blocks was hitherto carried out manually which was relatively troublesome and time-consuming and after each cutting step, the blocks had to be removed and re-applied in suitable positions for a succeeding stack.

SUMMARY OF THE INVENTION

It is an object of the present invention to provide a novel and more efficient means for obtaining accurate alignment of the sheet stacks on the guide rake.

According to the invention, the guide rake is provided with stack abutment means adjustable for positioning in the direction of movement of the rake. The adjustable means are preferably rake teeth and may be provided in sets at pairs spaced along the rake interspersed with fixed teeth, and a plurality of sets or pairs of adjustable teeth may be provided for use with different sizes of paper. The adjustable teeth can be arranged to be remotely controlled by an operator.

Conveniently, pairs of adjustable teeth are provided on the rake for at least three different sizes of paper and the adjustable teeth may be actuated electromechanically, hydraulically or pneumatically. The switching or control of the teeth can be effected by the operator from the switch desk of the paper-cutting machine. Likewise, it is also possible that adjustment of the teeth can be programmed in with the cutting operation so that at the beginning of the cut, the teeth are set completely automatically and at the end of he cutting automatically withdrawn.

Conveniently, the adjustable teeth are arranged on the gauge rake in such a way that, after extension into the working position, they can be continuously adjusted with respect to one another. By means of this possibility of continuous shifting, a smooth angular equalization is achieved in order, with obliquely printed material for cutting, to bring the print area into the exact cutting position for the cutting knife.

The invention will now be described by way of example only, with reference to the accompanying drawings in which:

DETAILED DESCRIPTION OF THE DRAWINGS

Figure 1:
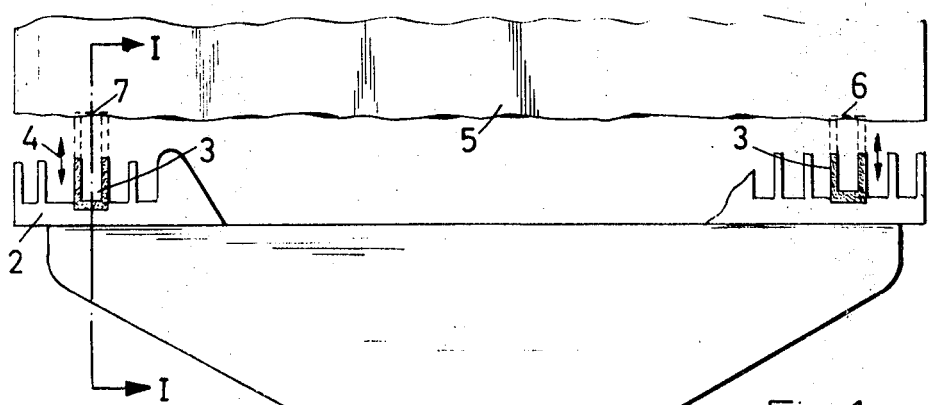
Figure 2:
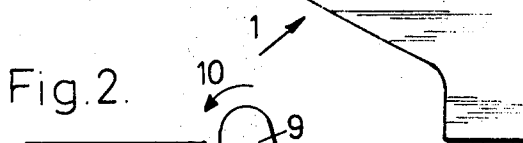
Figure 3:
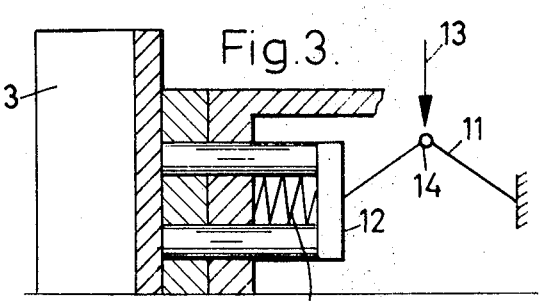
Figure 4:
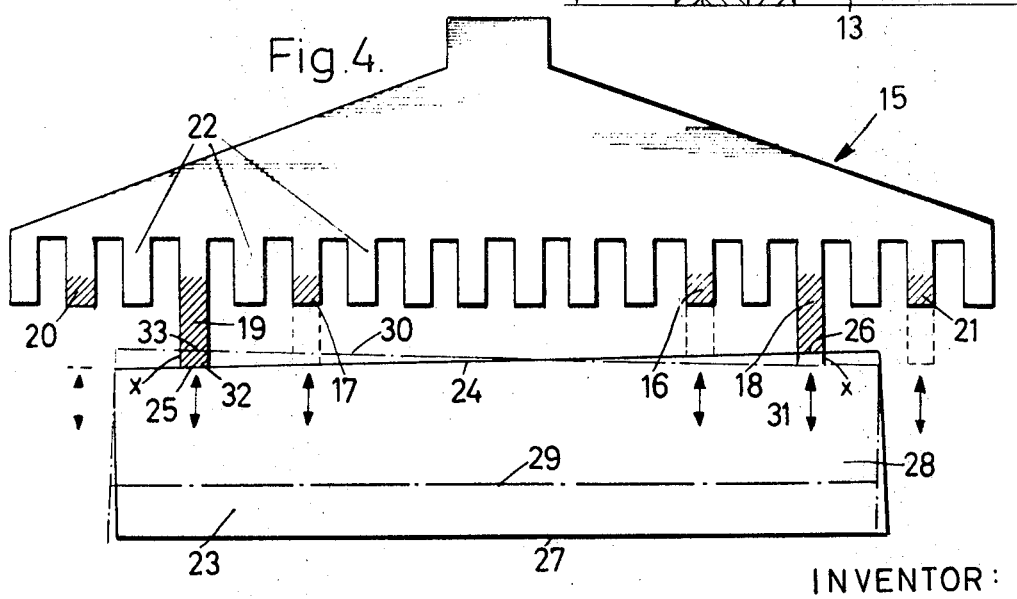

FIG. 1 is a plan view of a paper cutting machine feed gauge with adjustable teeth on the rake, FIG. 2 is a section along line I—I of FIG. 1 wherein adjustment of the teeth takes place by means of cams, the view looking in the direction of the arrows, FIG. 3 is a view partly in elevation and partly in section of further form of actuating arrangement for the adjustable teeth, and FIG. 4 is a plan view of a feed gauge having more adjustable teeth.

DETAILED DESCRIPTION OF THE INVENTION

Referring to FIG. 1, on a feed gauge 1 of a paper-cutting machine (not shown) is a guide rake 2 having adjustable teeth 3 which are movable in the direction of the arrow 4. In FIG. 1, the withdrawn position of the teeth 3 is shown by a continuous line, while the dotted line position of the teeth shows their working position, that is to say the position at which the stack 5 to be cut is applied and fixed at points 6, 7. In this example, there are two adjustable teeth 3 but more can be provided on the rake, to accommodate various paper sizes.

The means for moving the adjustable teeth is shown in FIGS. 2 and 3 in which, according to the embodiment of FIG. 2, each tooth 3 is held in the retracted position on the rake by means of a tension spring 8. The tooth 3 is brought into the working position (dotted line FIG. 1) by a cam 9 which may be actuated in a known way by a geared motor or the like. In this position, a paper stack 5 having a convex bearing surface would be firmly located at the points 6, 7 by teeth 3 and thereby secured in its working position. In the position of the cam 9 shown, the adjustable tooth is in the starting position, i.e. in which it is aligned with the other teeth of the rake. If the cam 9 is turned in the direction of the arrow 10, then the tooth 3 is brought, against the action of the spring 8, into the extended, i.e. the working position.

In the embodiment according to FIG. 3, an elbow lever 11 engages on a frame 12 which, under the action of a spring 13, holds the tooth 3 in the starting position. If the elbow lever 11 is operated in the direction of the arrow 13, then the frame 12 and therewith the tooth 3 is brought, against the action of the spring 13, into the extended position, i.e. into the working position.

In this case, the actuation of the elbow lever 11 can be effected by means of an electromagnet, which engages at a hinge point 14 and the lift of which is so adjusted that the desired degree of movement of the tooth is obtained.

The working position of the teeth 3 is made visible conveniently by a sight mark on the ground glass plate of the optical measuring tape indicator of the paper-cutting machine. Thereby the operator can observe and control from the switch desk at any time the position of the teeth on the gauge rake.

According to FIG. 4, adjustable teeth are arranged on a feed gauge 15 to be shiftable mechanically, hydraulically or the like. In this arrangement three pairs of adjustable teeth are provided. Thus, by means of teeth 16, 17, teeth 18, 19 and teeth 20, 21, a shifting unit is formed in each case.

In the starting position, all adjustable teeth are aligned with fixed teeth 22 of the feed gauge. If a paper stack 23 is now to be shifted by the required angular measurement, and by means of the teeth 18, 19, then the two teeth 18, 19 are first shifted from the starting position into the working position. The tooth 19 occupies this working or end position in the drawing, while the tooth 18 has been withdrawn from the end position by the length X. An abutment edge 24 of the paper stack represented in the continuous line consequently lies on edge 25 and edge 26 of the teeth 18, 19. A printed line 27 to be cut, which runs obliquely to the abutment edge 24 of the paper stack 23, is aligned exactly parallel to the cutting knife by the shifting of the tooth 18 by the amount X, so that the cut runs in the print area, i.e. the line 27.

In a paper stack 28 represented by a broken line, an impression line 29 runs in the opposite direction obliquely to an abutment edge 30. For angular alignment, the two adjustable teeth 18, 19 are again used. In this case, the tooth 18 remains in its end position 31 while the tooth 19 is brought from its end position 32 by the amount X to the end position 33. The abutment edge 30 of the stack 28 now lies at a certain angle which corresponds to the amount of displacement X at the teeth 18, 19 so that the impression line 29 likewise runs obliquely with respect to the edge 30 by the amount X and is aligned parallel to the cutting line.

In this example, the two teeth 18, 19 have been used for angle alignment; but the individual teeth could be used in pairs or in any desired combination.

I claim:

1. The combination with a feed gauge of a paper cutting machine, of means for precisely aligning a paper stack to be cut and maintaining the stack in such aligned condition during its movement to a cutting unit, said aligning means including rake teeth defining stationary guide means and at least two movable guide means defined by rake teeth, said movable guide means being spaced axially of the stationary guide means, said movable guide means having a first position in alignment with the stationary guide means and a second position projecting beyond the stationary guide means, first means normally maintaining the movable guide means in the first position, and second means automatically operable for moving the movable guide means to the second position and upon deactivation of the second means, the first means returns the movable guide means to the first position.

2. The combination as claimed in claim 1 in which said first means is a tension spring and said second means a rotatable cam.

3. The combination as claimed in claim 1 in which said first means is a tension spring and said second means a pair of pivotally connected lever arms, with one arm being operably coupled to the movable rake tooth and the other arm to a fixed member.

4. The combination as claimed in claim 1 including means for relatively moving the movable rake teeth during cutting for obtaining an angled cut.

References Cited

UNITED STATES PATENTS

| 1,752,126 | 3/1930 | Thorne | 214—1.4 XR |
| 2,363,745 | 11/1944 | Petersen | 214—1.5 |
| 2,756,885 | 7/1956 | Ackermann | 214—514 |
| 3,032,209 | 5/1962 | Mead | 214—1.6 |

GERALD M. FORLENZA, Primary Examiner

F. E. WERNER, Assistant Examiner

U.S. Cl. X.R.
83—278